(12) United States Patent
Selewski et al.

(10) Patent No.: US 6,777,844 B2
(45) Date of Patent: Aug. 17, 2004

(54) BRUSHLESS MOTOR

(75) Inventors: Steven Selewski, Cadillac, MI (US); Mark Howie, Cadillac, MI (US); George H. Holling, Salt Lake City, UT (US)

(73) Assignee: Rexair, Inc., Troy, MI (US)

( * ) Notice: Subject to any disclaimer, the term of this patent is extended or adjusted under 35 U.S.C. 154(b) by 0 days.

(21) Appl. No.: 10/012,844

(22) Filed: Oct. 24, 2001

(65) Prior Publication Data

US 2003/0034699 A1 Feb. 20, 2003

Related U.S. Application Data

(60) Provisional application No. 60/270,231, filed on Feb. 21, 2001, provisional application No. 60/270,375, filed on Feb. 21, 2001, provisional application No. 60/243,559, filed on Oct. 26, 2000, and provisional application No. 60/242,857, filed on Oct. 24, 2000.

(51) Int. Cl.⁷ ................................................ H02K 1/00
(52) U.S. Cl. ..................... 310/193; 310/216; 310/172; 310/187; 310/168; 310/50
(58) Field of Search ........................ 310/172, 50, 193, 310/47, 185–188, 166, 216, 168, 156.57

(56) References Cited

U.S. PATENT DOCUMENTS

| | | | |
|---|---|---|---|
| 1,557,213 A | * 10/1925 | Lee | 388/803 |
| 3,586,942 A | 6/1971 | McMahan | 318/254 |
| 3,831,071 A | 8/1974 | Mitsui | 318/254 |
| 3,860,843 A | 1/1975 | Kawasaki et al. | 310/67 |
| 3,956,678 A | * 5/1976 | Byrne et al. | 318/138 |
| 4,006,375 A | 2/1977 | Lyman, Jr. et al. | 310/49 |
| 4,013,910 A | 3/1977 | Deming | 310/211 |
| 4,125,792 A | 11/1978 | Schmider | 310/268 |
| 4,138,619 A | 2/1979 | Broadway et al. | 310/184 |
| 4,169,990 A | 10/1979 | Lerdman | 318/138 |
| 4,260,923 A | 4/1981 | Rawcliffe | 310/184 |
| 4,321,494 A | 3/1982 | MacNab | 310/179 |
| 4,394,594 A | 7/1983 | Schmider et al. | 310/68 |
| 4,422,113 A | 12/1983 | Mabon | 360/78 |
| 4,433,261 A | 2/1984 | Nashiki et al. | 310/156 |
| 4,454,458 A | 6/1984 | Holland | 318/254 |
| 4,496,886 A | 1/1985 | Gordon et al. | 318/254 |
| 4,508,619 A | 4/1985 | Niitti et al. | 209/169 |
| 4,567,462 A | 1/1986 | Leiby | 340/347 |
| 4,575,667 A | 3/1986 | Kurakake | 318/803 |
| RE32,178 E | 6/1986 | Yoshizaki | 148/11.5 |

(List continued on next page.)

FOREIGN PATENT DOCUMENTS

| | | | | |
|---|---|---|---|---|
| DE | 19715942 A1 | 10/1997 | | |
| EP | 0291219 A2 | 11/1988 | | |
| EP | 0276624 B1 | 2/1993 | | |
| JP | 402184231 A | 7/1990 | | 310/156 |
| JP | 402246746 A | 10/1990 | | 310/156 |
| JP | 402246747 A | 10/1990 | | 310/156 |
| WO | WO 85/02951 | 7/1985 | | |
| WO | WO97/39512 | 10/1997 | | |

*Primary Examiner*—Dang Le
(74) *Attorney, Agent, or Firm*—Howard & Howard (57) ABSTRACT

A vacuum cleaner assembly includes a motor having a rotor and a stator for providing motive power to the assembly. The rotor and stator each include armatures having tips. In one aspect, the widths of the rotor and stator tips are different. In another aspect, the rotor armatures have a non-constant width. Another aspect discloses the motor being a two-phase brushless motor having an even number (N) of stator armatures and N+2 rotor armatures. In another aspect, a rotor armature includes an aperture. In another aspect, each rotor armature includes a plurality of layers laminated together, with one layer being dimensionally different than the other layers. In another embodiment of the present invention, a control circuit energizes the windings of the stator so as to toggle the rotor in a first direction before alternately energizing the windings to drive the rotor in a second direction.

15 Claims, 10 Drawing Sheets

U.S. PATENT DOCUMENTS

| | | | | |
|---|---|---|---|---|
| 4,630,033 A | | 12/1986 | Baker | 340/347 |
| 4,642,502 A | | 2/1987 | Carpenter et al. | 310/156 |
| 4,647,802 A | | 3/1987 | Konecny | 310/49 |
| 4,691,132 A | | 9/1987 | Bertram et al. | 310/156 |
| 4,693,734 A | * | 9/1987 | Erickson, Jr. | 96/333 |
| 4,698,537 A | | 10/1987 | Byrne et al. | 310/168 |
| 4,713,594 A | | 12/1987 | Bose et al. | 318/685 |
| 4,748,362 A | | 5/1988 | Hedlund | 310/168 |
| 4,837,472 A | | 6/1989 | Kotera | 310/156 |
| 4,843,271 A | | 6/1989 | Shah | 310/217 |
| 4,874,975 A | | 10/1989 | Hertrich | 310/186 |
| 4,883,999 A | | 11/1989 | Hendershot | 310/254 |
| 4,911,624 A | | 3/1990 | Bagepalli | 418/92 |
| 4,952,899 A | | 8/1990 | Kulka et al. | 336/160 |
| 5,015,903 A | | 5/1991 | Hancock et al. | 310/168 |
| 5,030,864 A | | 7/1991 | Van Hout et al. | 310/67 |
| 5,084,663 A | * | 1/1992 | Olsson | 318/701 |
| 5,122,705 A | | 6/1992 | Kusase et al. | 310/68 |
| 5,140,210 A | | 8/1992 | Shirakawa | 310/156 |
| 5,148,090 A | * | 9/1992 | Oku et al. | 318/107 |
| 5,164,622 A | * | 11/1992 | Kordik | 310/67 R |
| 5,168,190 A | * | 12/1992 | Bahn | 310/166 |
| 5,173,651 A | | 12/1992 | Buckley et al. | 318/701 |
| 5,175,461 A | | 12/1992 | Zigler et al. | 310/156 |
| 5,182,958 A | | 2/1993 | Black | 74/84 |
| 5,274,287 A | * | 12/1993 | Bahn | 310/68 B |
| 5,294,856 A | * | 3/1994 | Horst | 310/181 |
| 5,315,192 A | | 5/1994 | Satomi | 310/49 |
| 5,323,078 A | | 6/1994 | Garcia | 310/156 |
| 5,350,076 A | | 9/1994 | Kalan | 212/209 |
| 5,395,221 A | | 3/1995 | Tucker, Jr. et al. | 418/48 |
| 5,430,362 A | | 7/1995 | Carr et al. | 318/779 |
| 5,456,543 A | | 10/1995 | Witte et al. | 400/577 |
| 5,473,211 A | | 12/1995 | Arkkio | 310/166 |
| 5,486,730 A | | 1/1996 | Ludwig et al. | 310/156 |
| 5,563,463 A | | 10/1996 | Stark | 310/156 |
| 5,581,140 A | | 12/1996 | Futami et al. | 310/156 |
| 5,635,784 A | | 6/1997 | Seale | 310/90.5 |
| 5,643,168 A | | 7/1997 | Piramoon et al. | 494/16 |
| 5,668,430 A | | 9/1997 | Kolomeitsev | 310/266 |
| 5,672,925 A | | 9/1997 | Lipo et al. | 310/154 |
| 5,719,456 A | | 2/1998 | Kolomeitsev | 310/112 |
| 5,736,803 A | | 4/1998 | Masson | 310/156 |
| 5,747,912 A | * | 5/1998 | Sakuma et al. | 310/261 |
| 5,780,986 A | | 7/1998 | Shelton et al. | 318/432 |
| 5,786,652 A | | 7/1998 | Gueraud et al. | 310/263 |
| 5,825,113 A | | 10/1998 | Lipo et al. | 310/181 |
| 5,844,346 A | | 12/1998 | Kolomeitsev et al. | 310/254 |
| 5,898,246 A | * | 4/1999 | Hoffman | 310/60 R |
| 5,917,263 A | | 6/1999 | Sakuma et al. | 310/261 |
| 6,014,000 A | | 1/2000 | Gutierrez | 318/696 |
| 6,025,668 A | | 2/2000 | Kolomeitsev | 310/187 |
| 6,054,791 A | | 4/2000 | Lander | 310/233 |
| 6,133,656 A | | 10/2000 | Hisey | 310/68 |
| 6,140,728 A | | 10/2000 | Tomita et al. | 310/156 |
| 6,150,777 A | | 11/2000 | Lander | 318/245 |
| 6,198,195 B1 | * | 3/2001 | Embree et al. | 310/261 |
| 6,239,564 B1 | | 5/2001 | Boe et al. | 318/254 |
| 6,246,141 B1 | | 6/2001 | Bailey | 310/211 |
| 6,271,638 B1 | | 8/2001 | Erdman et al. | 318/439 |
| 6,271,639 B1 | | 8/2001 | Fei | 318/524 |
| 6,285,104 B1 | | 9/2001 | Nashiki | 310/184 |
| 6,291,949 B1 | | 9/2001 | Green | 318/254 |
| 6,316,858 B1 | * | 11/2001 | Phillips | 310/114 |

* cited by examiner

BRUSHLESS MOTOR

CROSS-REFERENCE TO RELATED APPLICATIONS

This application claims the benefit of the following U.S. Provisional Patent Application Ser. No. 60/242,857, filed Oct. 24, 2000; No. 60/243,559, filed Oct. 26, 2000; No. 60/270,375, filed Feb. 21, 2001 and No. 60/270,231, filed Feb. 21, 2001.

FIELD OF THE INVENTION

The present invention relates generally to motors and, more particularly, to a motor for a vacuum cleaner assembly and a method for starting and operating the same.

BACKGROUND OF THE INVENTION

Electric motors are used in a variety of applications. One such application is vacuum cleaners.

Vacuum cleaners of various designs are used in residential and commercial settings for a wide variety of cleaning purposes. These appliances develop suction force to create air flow which picks up large and small dust and dirt particulates from the surface being cleaned. These particulates are then separated from the ingested air within the vacuum cleaner for later disposal. One type of vacuum cleaner is a canister type which has a relatively stationary canister which is connected to a moveable wand by a flexible connecting hose. One particular design of canister type vacuum cleaner is known as a liquid bath type. This type of vacuum cleaner directs incoming air and particulates into contact with a liquid bath, which is typically water, which traps particulate matter such as dust and dirt particles entrained in the ingested air stream as the air stream impinges the surface of the liquid. A liquid bath type vacuum cleaner has a significant advantage in that its filtration mechanism is water, thereby eliminating the need for replacement filters. Accordingly, only the water in a liquid reservoir needs to be periodically changed.

An important component of all liquid type vacuum is the motor. Typically, the motor is of the type generally known as a universal motor. The motor converts electrical energy into kinetic energy, i.e., electrical energy is transferred through a pair of brushes to an armature, causing the armature to rotate.

One drawback of this type of motor is that it is prone to wear, resulting in mechanical breakdowns.

Brushless motors have certain advantages over these types of motors. There is simply not the wear and tear on the motor due to the brushes. However, typical one- and two-phase brushless motors are hard to start and the typical starting process is inefficient and causes wear and tear.

One type of brushless motor is the switched reluctance motor. Switched reluctance motors have a rotor and a stator. The stator includes windings which are energized in order to provide torque to the rotor, Previously, switched reluctance motors have had either the same number of poles on the stator and the rotor or are designed with more stator poles than rotor poles. The conventional wisdom was that additional stator poles reduce ripples in the torque applied to the rotor. Torque ripple is the variation in maximum available output torque as the position of the rotor poles varies with respect to the stator poles. However, the tradeoff with the additional stator poles is decreased efficiency.

The present invention is aimed at one or more the problems set forth above.

SUMMARY OF THE INVENTION AND ADVANTAGES

It is an object of the present invention to provide a motor having lower torque ripple and improved starting torque thereby resulting in less wear and tear on the motor and increased efficiency.

The vacuum cleaner assembly of the present assembly includes a housing assembly having an inlet port, an outlet port and a plurality of components, a motor having a rotor and a stator disposed in the housing for providing motive power to the plurality of components. The rotor includes a plurality of rotor armatures each with a rotor tip and the stator includes a plurality of stator armatures each with a stator tip. The vacuum cleaner assembly of the present invention further includes a blower assembly disposed in the housing assembly which is driven by the motor for drawing air inwardly through the inlet port and exhausting air outwardly through the outlet port. A separator is disposed in the housing assembly for filtering air drawn inwardly through the inlet port before it is exhausted through the outlet port.

In one aspect of the present invention, the rotor tips have a width different than the width of the stator tips. In another aspect of the present invention, the rotor armatures have a non-constant width. In yet another aspect of the present invention, the motor is a two-phase brushless motor wherein the stator includes an even number (N) of stator armatures and the rotor includes N+2 rotor armatures. In still another aspect of the invention, the motor includes a rotor with at least one of the rotor armatures having an aperture therein for creating an imbalance in the magnetic flux generated by the stator. According to another aspect of the vacuum cleaner assembly of the present invention, each of the rotor armatures includes a plurality of layers laminated together, with one of the plurality of layers having dimensions different than other of the plurality of layers.

A second embodiment of the vacuum cleaner assembly of the subject invention, includes a control circuit for controlling the motor to alternately energize a first pair of windings for attracting a first set of the permanent magnets and causing the rotor to rotate in a first direction and a second pair of the windings for attracting a second set of the permanent magnets and causing the rotor to continue to rotate in the first direction. In another aspect of the present invention, the control circuit is adapted for energizing the first pair of the windings for attracting the first set of permanent magnets and causing the rotor to rotate in a second direction prior to alternately energizing the first and second pairs of windings to rotate the rotor in the first direction. In yet another aspect of the present invention, the control circuit is adapted for measuring the motor temperature and comparing the motor temperature with a predetermined temperature for reducing the constant power delivered to the motor when the motor temperature exceeds the predetermined temperature. According to another aspect of the present invention, the control circuit is adapted for shutting down the motor when the motor temperature exceeds the predetermined temperature.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

With reference to the drawings and in operation, the present invention provides a switched reluctance motor. The switched reluctance motor has a stator with N armatures and a rotor with N+2 armatures. With specific reference to FIG. 1, the present invention is suitable operation of a liquid-bath type vacuum cleaner 102, however, the present invention is not limited to such and the following discussion with regard to the vacuum cleaner 102 is for discussion purposes only.

Figure 1:
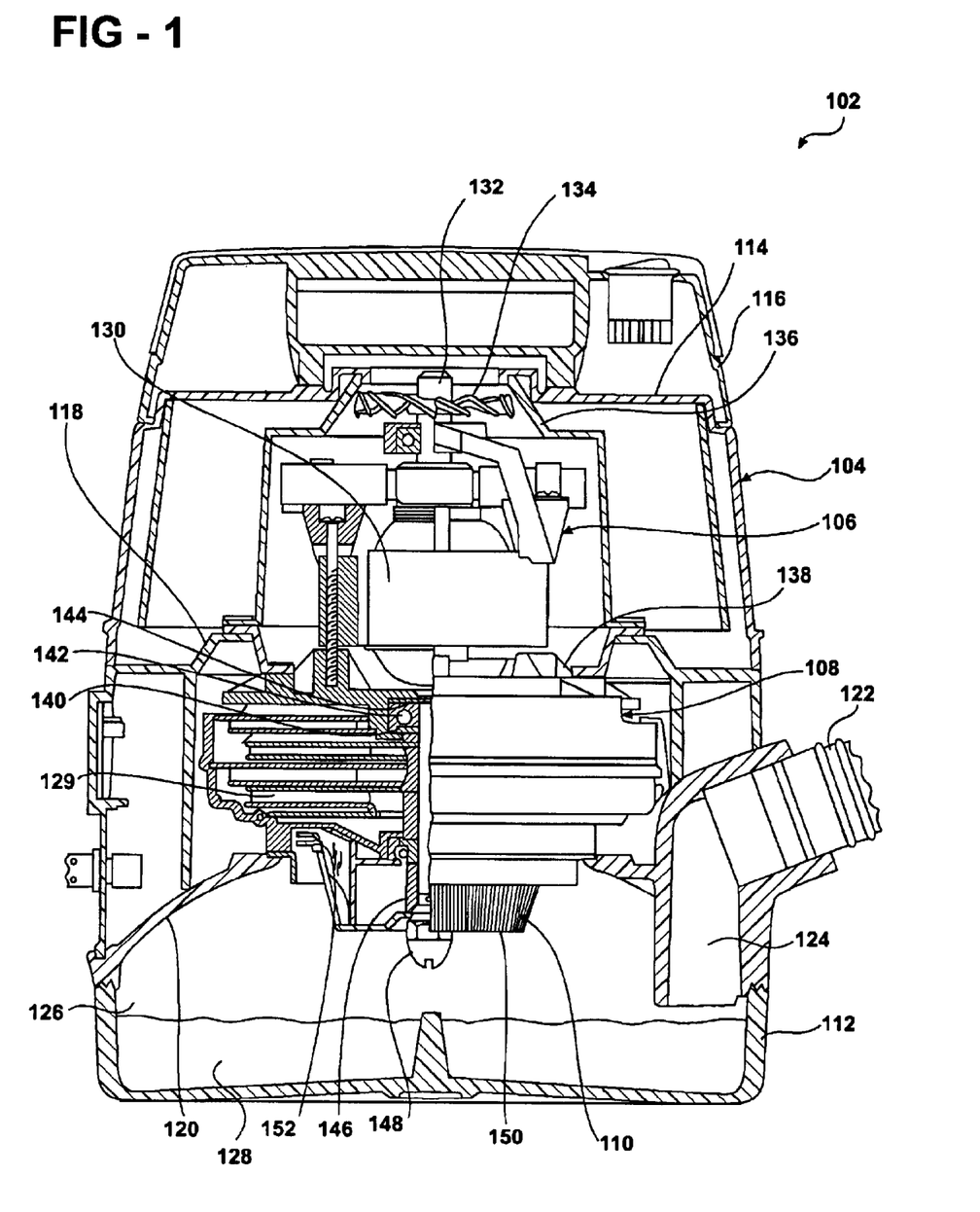
FIG. 1 is a diagrammatic illustration of an exemplary vacuum cleaner having a switched reluctance motor.

In FIG. 1 there is shown a vertical sectional partially fragmented view of the vacuum cleaner 102. The vacuum cleaner 102 principally comprises a housing assembly 104, a motor 106, a blower assembly 108, and a separator 110.

The housing assembly 104 includes a lower water pan 112, a cap 114, and a cap cover 116. Preferably, the housing assembly 104 is easily removable from the lower water pan 112 to enable the convenient removal and replacement of liquid therein. The motor assembly 106 and the blower assembly 108 are generally centrally supported within the housing assembly 104 by providing a pair ring-shaped support members 118, 120.

A vacuum hose 122 is also shown attached to an inlet port 124. The inlet port 124 opens into a lower chamber area 126 wherein a water or other liquid-type bath 128 is contained in the lower water pan 112.

The motor 106 provides motive power for operation of a fan assembly 129 of the blower assembly 108. The motor 106 includes a central rotating armature or rotor 130 encircling and connected to a motor shaft 132, which extends downwardly into the lower assembly 108. In accordance with the present invention, the motor 106 comprises a brushless motor which is described in more detail below.

An axial flow motor fan 134 is attached to the upper portion of the motor shaft 38 and generates air flow for cooling the motor assembly 106. The direction of air flow past the motor assembly 106 generated by the fan 134 is controlled by providing a baffle 136 which generally encircles and encloses the motor assembly 106. A motor base 138 further defines a bearing retainer pocket 140 which receives a middle bearing assembly 142, which is secured by a push-in type clip 144.

The separator 110 itself is removably attached at a lower, threaded end 146 of the motor shaft 132 by an acorn nut 148. The separator 110 further includes a plurality of slots 150 for allowing intake air to be drawn and a removable spider 150 to provide additional structural support to the separator 110 and to help generate centrifugal force within the separator 110.

In operation, the motor 106 of the vacuum cleaner 102 operates to provide a motive force to the motor shaft 132 to rotate the fan assembly 129 of the blower 108 and the separator 110 rapidly about a central axis. The blower 108 operates to create a strong, suction force (vacuum) to draw air entrained with dust and dirt particulates in through the vacuum hose 122 and the inlet port 124 and into contact with the liquid bath filter 128. The liquid bath filter 128, which may employ one or more of a variety of liquid agents but preferably comprises water, operates to trap the majority of dust and dirt particulates intaked into lower chamber 126. The remaining dust and dirt particulates, which will be mostly microscopic in size, will be drawn by the blower 108 up into the separator 110 through the slots 150.

The separator 110 operates to separate the dust and dirt particulates from the intaked air by centrifugal force (i.e., "centrifugation") generated as a result of its rapid, axial rotation. The centrifugal force also operates to forcibly exhaust the particulates outwardly from the separator 110. Eventually, many of the dust and dirt particulates that initially escaped entrapment in the liquid bath filter 128 will be trapped therein, and the particulates which are not will be drawn upwardly again into the separator 110 for further separation. The clean air mass within the separator 110, which will exist after the dust and dirt particulates are removed, will then be drawn upwardly through the blower 108 and expelled into the ambient environment through air chamber 152.

The foregoing has been intended as a general description only of the internal operation of a vacuum cleaner in which the present invention may be used. The vacuum cleaner 102 described above is exemplary only and the present invention is not limited to such.

Figure 2:
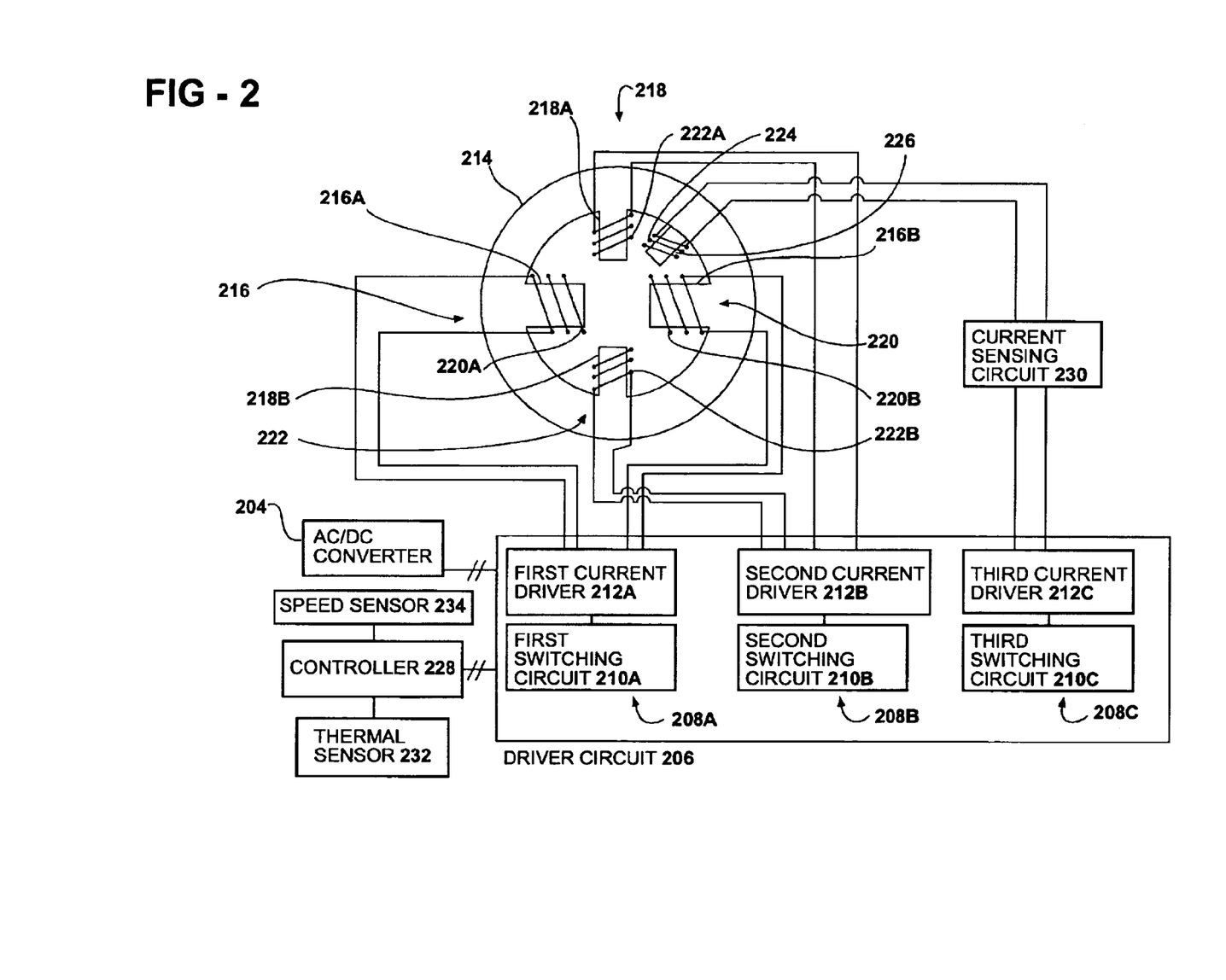
FIG. 2 is a diagrammatic illustration of a stator of the switched reluctance motor of FIG. 1 having four (4) armatures and a block diagram of a controller and a driver circuit.

With reference to FIG. 2, as stated above the motor 106 comprises a switched reluctance motor 106. The motor 106 is controlled by a control circuit 202. The control circuit 202 includes an AC/DC converter 204 and a driver circuit 206. The driver circuit 206 includes first and second pulse width modulated (PWM) circuits 208A, 208B. As shown, the first PWM circuit 208A includes a first switching circuit 210A and a first current driver 212A. The second PWM circuit 208B includes a second switching circuit 210B and a second current driver 212B.

The switched reluctance motor 106 includes a stator 214. The stator 214 includes N armatures 214.

With specific reference to FIG. 2, in one embodiment the switched reluctance motor 106 is a two phase motor and the stator 214 therefore has four armatures: first, second, third, and fourth stator armatures 216A, 218A, 216B, 218B arranged in first and second pairs of diametrically opposed stator armatures 216, 218. The first pair of diametrically opposed stator armatures 216 includes the first and third stator armatures 216A, 216B and the second pair of diametrically opposed stator armatures 218 include the second and fourth stator armatures 218A, 218B.

The first, second, third, and fourth stator armatures 216A, 218A, 216B, 218B have respective first, second, third and fourth stator windings 220A, 220B, 222A, 222B. The first and third stator windings 220A, 220B form a first pair of stator windings 220 and the second and fourth stator winding 222A, 222B form a second pair of stator windings 222.

The first pair of stator windings 220 are electrically coupled to the first PWM circuit 208A and the second pair of stator windings 222 are electrically coupled to the second PWM circuit 208B.

Figure 3:
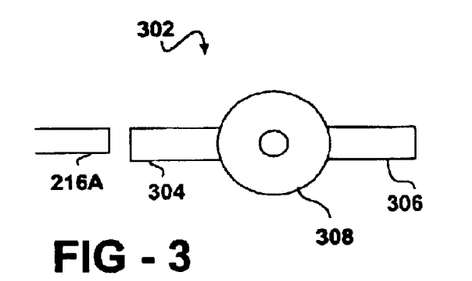
FIG. 3 is a diagrammatic illustration of a rotor, according to a first embodiment of the present invention.

With specific reference to FIG. 3, in another embodiment the switched reluctance motor 106 is a three phase motor with six (6) stator armatures and eight (8) rotor armatures.

The motor 106 is controlled by a control circuit 302. The control circuit 302 includes an AC/DC converter 304 and a driver circuit 306. The driver circuit 306 includes first, second, and third pulse width modulated (PWM) circuits 308A,308B,308C. As shown, the first PWM circuit 308A includes a first switching circuit 310A and a first current driver 312A, the second PWM circuit 308B includes a second switching circuit 310B and a second current driver 312B, and the third PWM circuit 308C includes a third switching circuit 310C and a third current driver 312C.

The three phase switched reluctance motor 106 includes a stator 314. The stator 314 includes six armatures armatures: first, second, third, fourth, fifth and sixth stator armatures 316A, 318A, 320A, 316B, 318B, 316C, 318C arranged in first, second, and third pairs of diametrically opposed stator armatures 316, 318, 320.

The first pair of diametrically opposed stator armatures 316 includes the first and fourth stator armatures 316A, 316B, the second pair of diametrically opposed stator armatures 318 includes the second and fifth stator armatures 318A, 318B, and the third pair of diametrically opposed stator armatures 320 includes the third and sixth stator armatures 320A,320B.

The first, second, third, fourth, fifth and sixth stator armatures 316A, 318A, 320A, 316B, 318B, 320B have respective first, second, third, fourth, fifth and sixth stator windings 322A, 324A, 326A, 322B, 324B, 326B. The first and fourth stator windings 322A, 322B form a first pair of stator windings 322, the second and fifth stator windings 324A, 324B form a second pair of stator windings 324, and the third and sixth stator windings form a third pair of stator windings 326.

The first pair of stator windings 322 are electrically coupled to the first PWM circuit 308A, the second pair of stator windings 324 are electrically coupled to the second PWM circuit 308B, and the third pair of stator windings 326 are electrically coupled to the third PWM circuit 308C.

The motor 106 includes the rotor 130 mounted to the motor shaft 132 and centered within the stator 214, 314. The stator 214, 314 and the rotor 130 are preferably constructed with a plurality of layers laminated together in a conventional manner. Preferably, the layers are composed from a high iron content steel.

The rotor 130 preferably includes N+2 rotor armatures (where N is the number of stator armatures). Each rotor armature includes a permanent magnet (not shown) attached in a conventional manner.

In operation, the control circuit 202,302 controls both the starting of the motor 106 and the operation of the motor 106 thereafter. During normal operation of the motor 106, torque is produced by alternating energizing the pairs of diametrically opposed stator windings 214, 216, 322, 324, 326.

In conventional brushless motors, the motor is started by simply beginning the normal control sequence of alternately energizing the pairs of stator windings until the rotor "catches up" and is rotating. This produces inefficiencies in the motor and increased wear and tear on the motor.

With reference to FIGS. 4–7, the present invention provides for a number of improved rotor designs and control schemes aimed at improving the efficiency and life of the motor. The rotor designs and control schemes described below may be used independently or jointly. For explanatory purposes only, the designs discussed below are illustrated using a rotor having four (4) armatures. However, the designs are equally applicable to rotors having any number of armatures.

Figure 4:
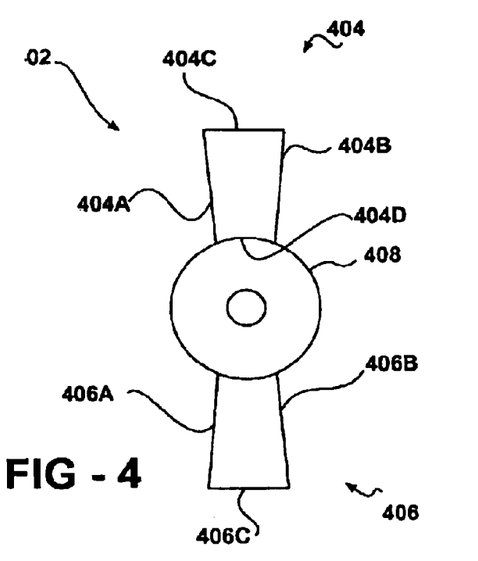
FIG. 4 is a diagrammatic illustration of a rotor, according to a second embodiment of the present invention.

With particular reference to FIG. 4, a first rotor 402 has four rectangular armatures 404, 406, 408, 410 and a center portion 412. The outer edge of each armature 404,406,408, 410 may be curved.

Figure 5:
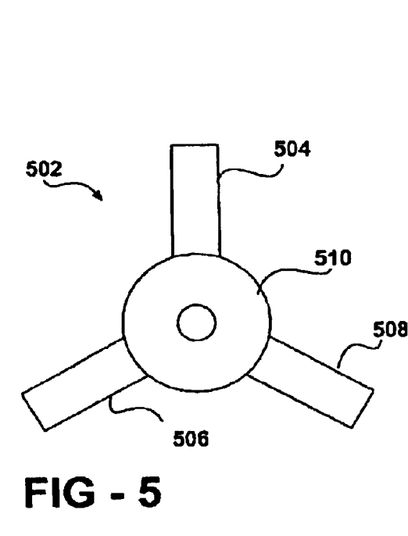
FIG. 5 is a diagrammatic illustration of a rotor, according to a third embodiment of the present invention.

With particular reference to FIG. 5, a second rotor 502 has four armatures 504, 506, 508, 510 and a center portion 512. Each armature 504,506,508,510 has two equal sides 504A, 504B, 506A, 506B, 508A, 508B, 510A, 510B and a long side 504C, 506C, 508C, 510C and a short side 504D, 506D, 508D, 510D. Alternatively, the long side 504C, 506C, 508C, 510C of each armature 504, 506, 508, 510 may be curved.

Figure 6:
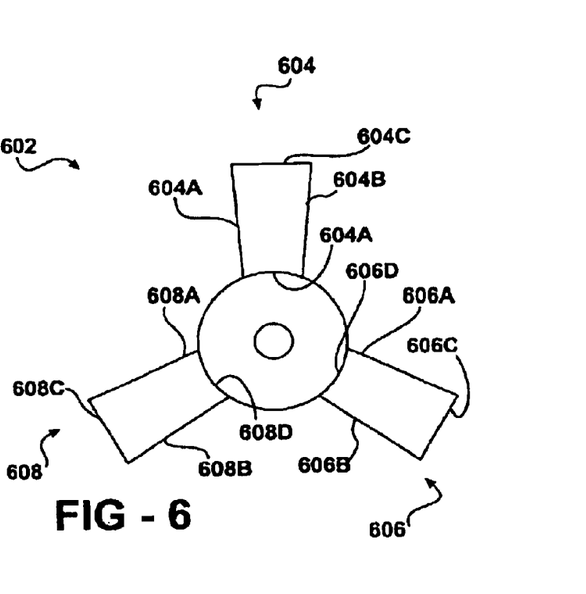
FIG. 6 is a diagrammatic illustration of a rotor, according to a fourth embodiment of the present invention.

With particular reference to FIG. 6, a third rotor 602 has first, second, third, fourth, fifth, and sixth 604, 606, 608, 610, 612, 614 spaced equidistantly around a center portion 616. Each armature 604, 606, 608, 610, 612, 614 has two equal sides 604A, 604B, 606A, 606B, 608A, 608B, 610A, 610B, 612A, 612B, 614A, 614B and a long side 604C, 606C, 608C, 610C, 612C, 614C and a short side 604D, 606D, 608D, 610D, 612D, 614D. Alternatively, the long side 604C, 606C, 608C, 610C, 612C, 614C of each armature 604,606, 608,610,612,614 may be curved.

The present invention encompasses several modifications to the general structure of the rotor designed to create an imbalance in the magnetic flux generated by the stator windings or coils 216, 218, 322, 324, 326. This imbalance is used during starting of the motor to help the rotor begin to rotate.

With reference to FIGS. 7–10, the rotor 130 includes an oversized layer.

Figure 7:
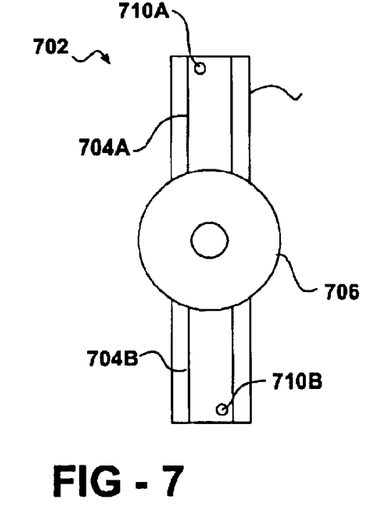
FIG. 7 is a diagrammatic illustration of a rotor having an oversized layer, according to an embodiment of the present invention.

With particular reference to FIG. 7, a rotor 702 has four armatures 704A, 704B, 704C, 704D and a center 706. The armature 704 is comprised of a plurality of layers and includes an oversized layer 708. The oversized layer 708 is dimensionally different than the plurality of layers. In one aspect of the present invention, the oversized layer extends past the sides of the other layers.

Figure 8:
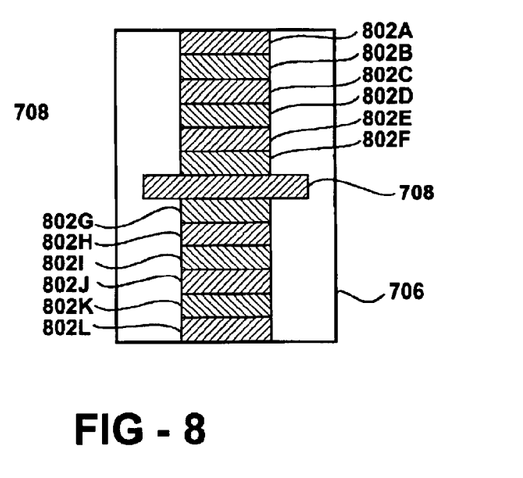
FIG. 8 is a side view of the rotor of FIG. 7.

With particular reference to FIG. 8, the oversized layer 708 may be between the other layers 802A–F, 802G–L, as shown. Alternatively, the oversized layer 708 could be positioned at the top or bottom of the rotor 702. It should also be noted that with respect to the oversized layer, the shape of the armature 704 is not important and the rectangular shape shown in FIG. 8 is exemplary only. Also, the length of the oversized layer 708 is shown as being as long as the armatures 704A, 704B, however, the oversized layer 708 may by shorter or longer than the armatures 704A, 704B.

Figures 9, 10:
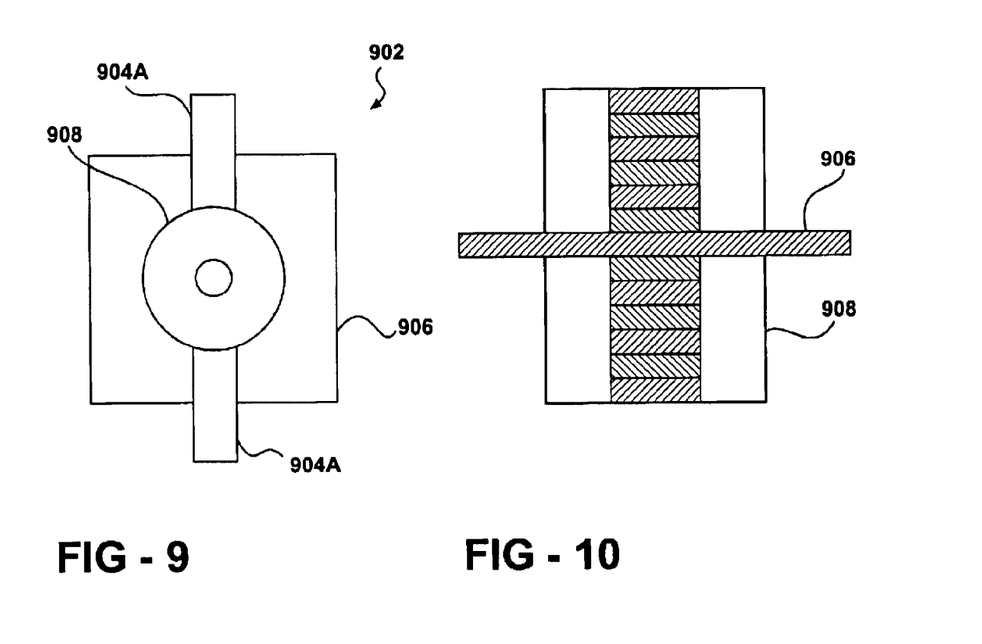
FIG. 9 is a diagrammatic illustration of a rotor having an oversized layer, according to another embodiment of the present invention.
FIG. 10 is a side view of the rotor if FIG. 9.

With reference to FIG. 9, a rotor 902 has four armatures 904A, 904B, 904C, 904D and an oversized layer 906 which extends outward from the center 908 of the rotor 902 in all directions. The oversized layer 906 may be square shaped as shown or any other shape, for example, circular. A side view of the rotor 902 is shown in FIG. 10. Again, the oversized layer 906 could be positioned at the top or bottom of the rotor 902. Also, the length of the oversized layer is 906 is shown as being shorter then the armatures 904A, 904B, however, the oversized layer 906 may by longer than or the same length as the armatures 904A, 904B.

Figure 11:
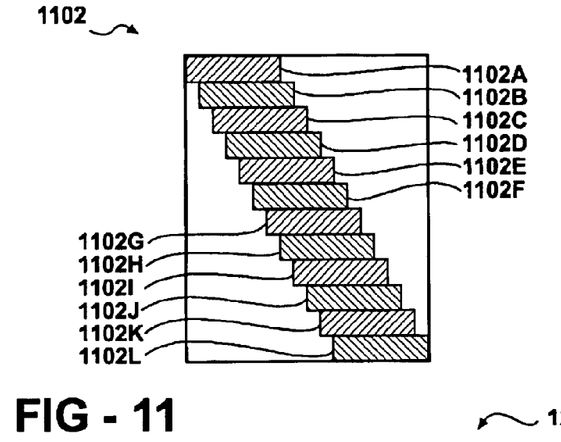
FIG. 11 is a diagrammatic illustration of a rotor having offset layers, according to an embodiment of the present invention.
Figure 12:
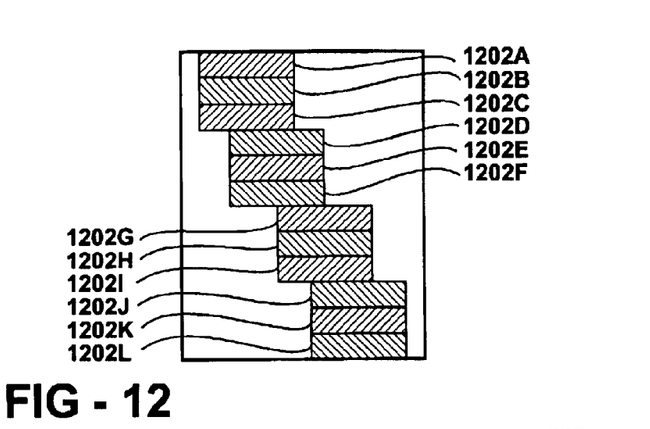
FIG. 12 is a diagrammatic illustration of a rotor having offset layers, according to another embodiment of the present invention.
Figure 13:
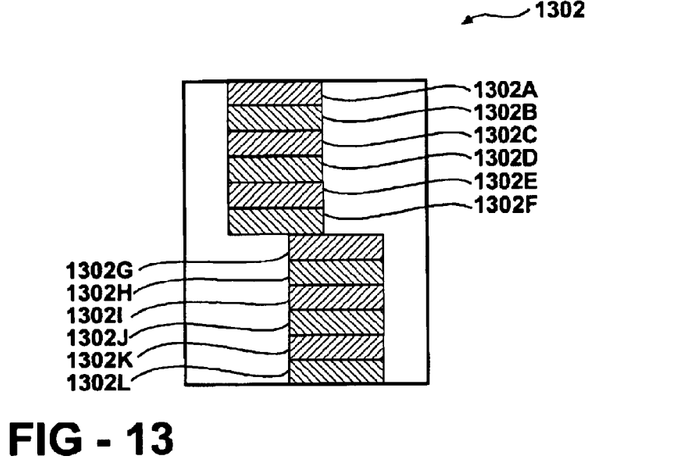
FIG. 13 is a diagrammatic illustration of a rotor having offset layers according to still another embodiment of the present invention.

Returning to FIG. 7, one or more of the rotor armatures 704A, 704B may include an aperture 710A, 710B, 710C, 710D to create an imbalance in the magnetic flux. With reference to FIGS. 11–13, the rotor armatures include a plurality of layers that are offset. With particular reference to FIG. 11, an armature 1102 is composed of a plurality of layers 1102A–1102G. Each layer 1102A–1102G is offset from the one above it. With particular reference to FIG. 12, an armature 1202 is composed of a plurality of layers 1202A–1202G. The layers 1202A–1202G are grouped 1202A–1202C, 1202D–1202F, 1202G-12021, 1202J–1202L with each layer 1202A–1202G in each group 1202A–1202C, 1202D–1202F, 1202G-12021, 1202J–1202L vertically aligned. Each group 1202A–1202C, 1202D–1202F, 1202G–1202I, 1202J–1202L is offset from the group above it. With particular reference to FIG. 13, an armature 1302 is composed of a plurality of layers 1302A–1302G. The layers 1302A–1302G are grouped in two groups, 1302A–1302F, 1302G–1302L with each layer 1302A–1302L in each group being vertically aligned. The two groups 1302A–1302F, 1302G–1302L being offset. It should be noted that in the examples above, there are 12 layers shown. This is exemplary only.

Returning to FIG. 2, the rotor 130 may include a starting armature 224 and a starting coil 226. The driver circuit 206 includes a sensor PWM circuit 208C with a sensor switching circuit 210C and a sensor current driver 212C. The starting coil 226 is electrically coupled to the sensor current driver 212C. In order to start the motor 106, the sensor PWM circuit 208C energizes, i.e., applies a PWM signal, to the starting coil 226, preferably, for a predetermined period of time. The applied PWM signal generates a magnetic flux that is adapted to start the rotor 130 rotating. An additional piece of magnetic material (not shown) may be coupled to the rotor 130 to interact with the magnetic flux generated by the starting coil 226.

Alternatively, the rotor armatures may be generally curved and have two asymmetrical sides.

The motor 106 may also be started by individually controlling the current supplied to the first, second, third and fourth stator windings 220A, 222A, 220B, 222B. With reference to FIG. 2, the driver circuit 206 may be controlled by a microprocessor or application specific integrated circuit (ASIC) controller 228. The controller 228 is coupled to the driver circuit 206. The controller 228 and driver circuit 206 are jointly adapted to individually energize the first, second, third and fourth stator windings 220A, 222A, 220B, 222B. For example, the controller 228 may actuate the driver circuit 206 to energize the windings 220A, 222A, 220B, 222B in the following order to start the motor 106:

first stator winding 220A;
second stator winding 222A;
third stator winding 220B; and
fourth stator winding 222B.

The windings 220A, 222A, 220B, 222B may alternatively be energized in reverse order:

fourth stator winding 222B;
third stator winding 220B;
second stator winding 222A; and
first stator winding 222A.

Preferably, the windings 220A, 222A, 220B, 222B are repeatedly energized for a predetermined period of time or cycles.

Any one of the methods described above may be used to start the motor 106. Alternatively, the controller 228 and the driver circuit 206 may be adapted to use two or more of the methods to start the motor 106. For example, the driver circuit 206 may be adapted to:

First, energize the starting coil 226, preferably, for a predetermined period of time; and Second, energize the windings 220A, 222A, 220B, 222B in reverse order.

When the vacuum cleaner 102 is turned off, the rotor 130 will generally be rotating. If the stator windings 220A, 222A, 220B, 222B are not energized, the rotor 130 will continuing turning until the inherent friction in the motor 106 stops it. The rotor 130 may be stopped in a shorter time period by:

Energizing the first, second, third and fourth stator windings 220A, 222A, 220B, 222B simultaneously for a predetermined period of time or until the rotor 130 stops moving;

Energizing a single stator winding 220A, 222A, 220B, 222B for a predetermined period of time or until the rotor 130 stops moving; or, Energizing two or three stator windings 220A, 222A, 220B, 222B for a predetermined period of time or until the rotor 130 stops moving; or Energizing the starting coil 226 for a predetermined period of time or until the rotor 130 stops rotating.

During operation of the motor 106, it is necessary to know the speed of the rotor 130 and/or its absolute position. In one embodiment, a current sensing circuit 230 measures the back induced current in the starting coil 226, i.e., the current induced by the magnetic flux in the motor 106. The back induced current is an indication of the speed of the rotor 130. It should be noted, that during normal operation, the starting coil 226 is not energized.

In a second embodiment, a speed sensor 234 is coupled between the motor 106 and the controller 228. Preferably, the speed sensor 234 is a proximity detection sensor, such as a Hall-effect sensor. The speed sensor 234 may be mounted is close proximity to any rotating part, such as the axial flow motor fan 134, the rotor 130, or the separator 110.

A piece of magnetic material (not shown) may be mounted to the rotating part, i.e., the axial flow motor fan 134, the rotor 130, or the separator 110, to detect absolute position.

Figure 14:
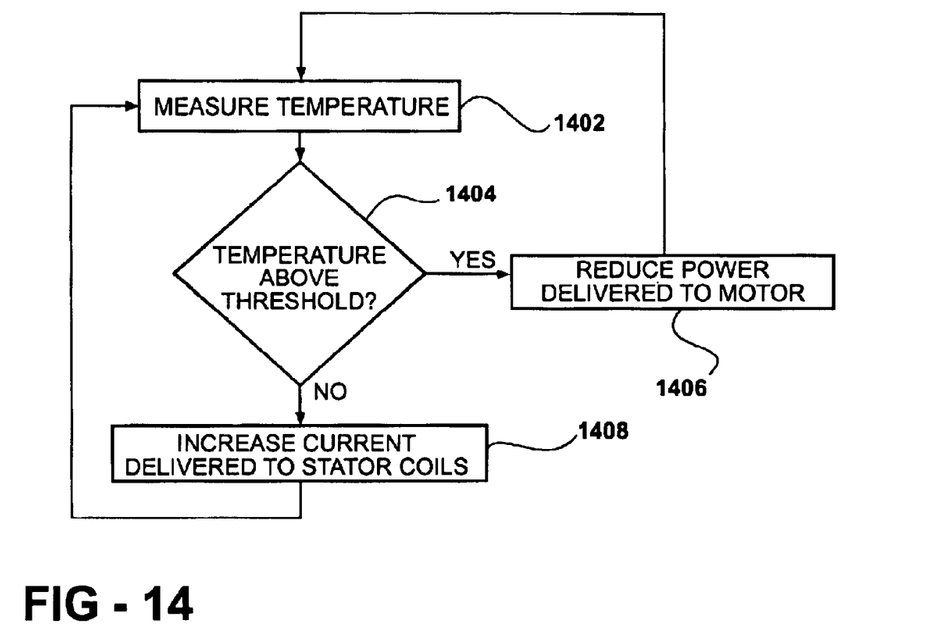
FIG. 14 is a flow diagram illustrating control of the motor of FIG. 1, according to an embodiment of the present invention.

After starting, the motor 106 may be run using several different control schemes. With reference to FIG. 14 in one embodiment, the controller 228 directs the control circuit 202 to deliver constant power, i.e., constant average current, to the motor 106 and constant power delivered to the motor 106 is reduced if the temperature exceeds a predetermined threshold. In addition, if the motor 106 continues to overheat after the power delivered to the motor is reduced, then the motor 106 is shutdown. In a first control block 1402, the temperature of the motor 106 is measured by the thermal sensor 234. The thermal sensor 234 may be located in any suitable location within the motor assembly 106.

In a first decision block 1404, if the measured temperature is above a predetermined threshold, then control proceeds to a second control block 1406. In the second control block 1406, the power delivered to the motor 106 is reduced. Control is then returned to the first control block 1402 to continue measuring temperature and comparing measured temperature to a predetermined threshold. If the measured temperature remains above the predetermined threshold, the power delivered to the motor 106 may be further reduced until the motor is shut down completely if the measured temperature fails to fall below the predetermined threshold within an acceptable time.

If the measured temperature is not above the predetermined threshold than control proceeds to a third control block 1408. In the third control block 1408, the controller 228 directs the control circuit 202 to direct constant power to the motor 106. Control then returns to the first control block 1402.

Figure 15:
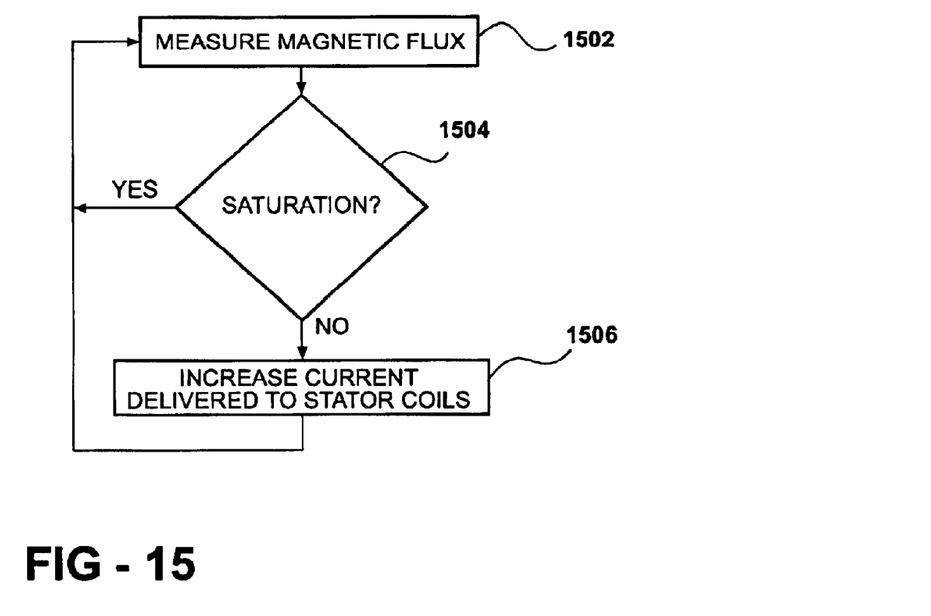
FIG. 15 is a flow diagram illustrating control of the motor of FIG. 1, according to another embodiment of the present invention.

With reference to FIG. 15 in another embodiment, the controller 228 directs the control circuit 202 to energize to the stator coils 220A,220B,220C,22D with just enough current to saturate the magnetic flux within the motor 106.

In a fourth control block 1502, the magnetic flux within the motor 106 is measured. Several different parameters may be used an indication of the magnetic flux including:

the temperature of the motor 106 as measured by the thermal sensor 232;

the speed of the motor 106 as measured by the speed sensor 234; or the back EMF current generated by the magnetic flux in the starting coil 226 as measured by the current sensing circuit 230.

In a second decision block 1504 if the magnetic flux within the motor 106 is saturated, then control returns to the fourth control block 1502. Saturation is detected when there is no change in the measured parameter after the current has been increased (temperature, speed, or back EMF current).

If the magnetic flux is not saturated, then control proceeds to a fifth control block 1506. In the fifth control block 1506, the average current supplied to the stator coils 220A, 220B, 222A, 222B is incrementally increased by a predetermined value and control returns to the fourth control block 1502.

Figure 16:
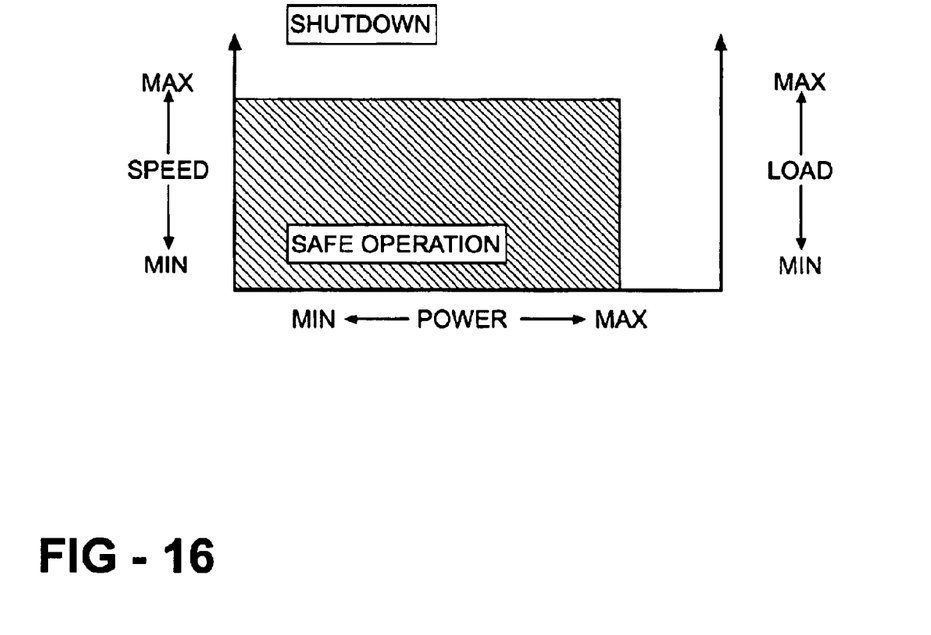
FIG. 16 is a chart illustrating operation of the motor of FIG. 1, according to an embodiment of the present invention.

Additional safeguard methods may also be included in the controller 228. With reference to FIG. 16, the speed of the motor 106 is limited when the motor 106 is at maximum load (i.e., the air path is unrestricted) and the power is limited when the motor 106 is at no load (i.e., the air path is restricted or blocked).

Figure 17:
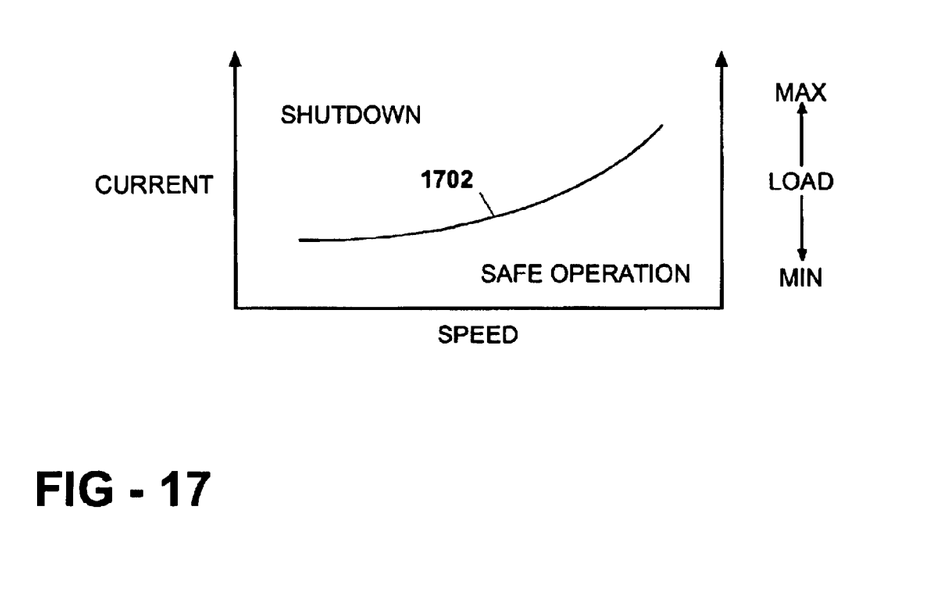
FIG. 17 is a chart illustrating operation of the motor of FIG. 1, according to another embodiment of the present invention.

With reference to FIG. 17, a temperature threshold curve 1702 sets the threshold at which the motor 106 is shutdown. The vacuum cleaner 102 may include multiple powered accessories. The threshold curve 1702 may be adjusted as a function of the presence or absence of an accessory, or the power supplied to an attached accessory.

Other safety enhancements include shutdown of the motor if the separator becomes disengaged or is not installed properly or if abnormal vibrations are detected. Absence or improper installation may be detected physically by an optical or Hall effect sensor (not shown) or as a function of the current loading of the motor 106. Vibrations of the motor 106 may be detected by a accelerometer or tuned beam sensor (not shown) or as a function of the current loading of the motor 106.

Figure 18A:
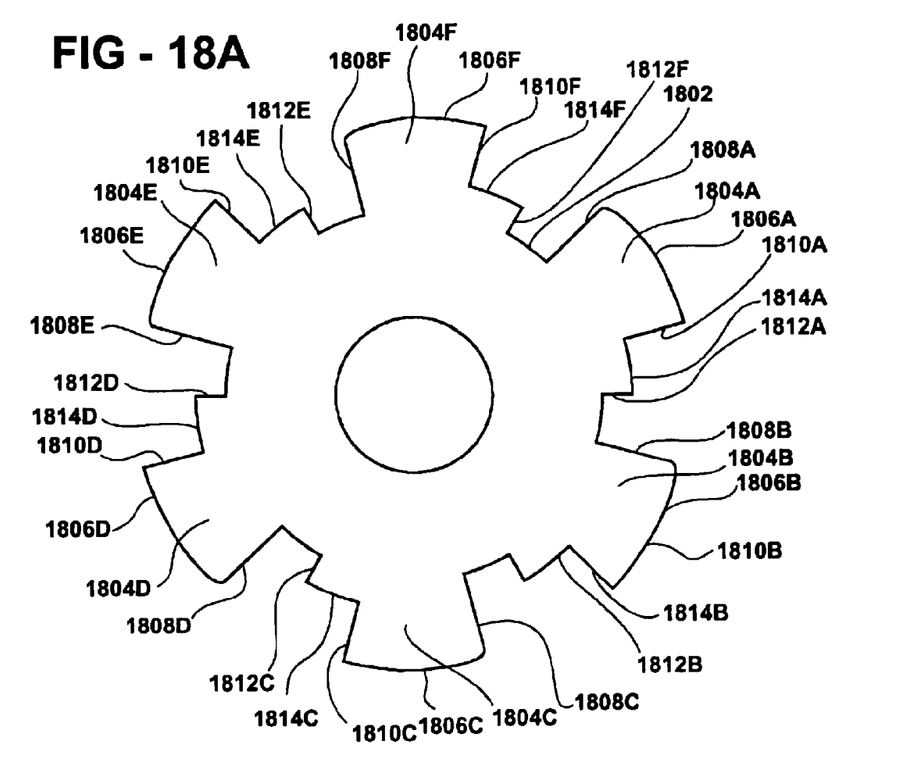
FIG. 18A is a diagrammatic illustration of a rotor having rotor armatures, according to an embodiment of the present invention.
Figure 18B:
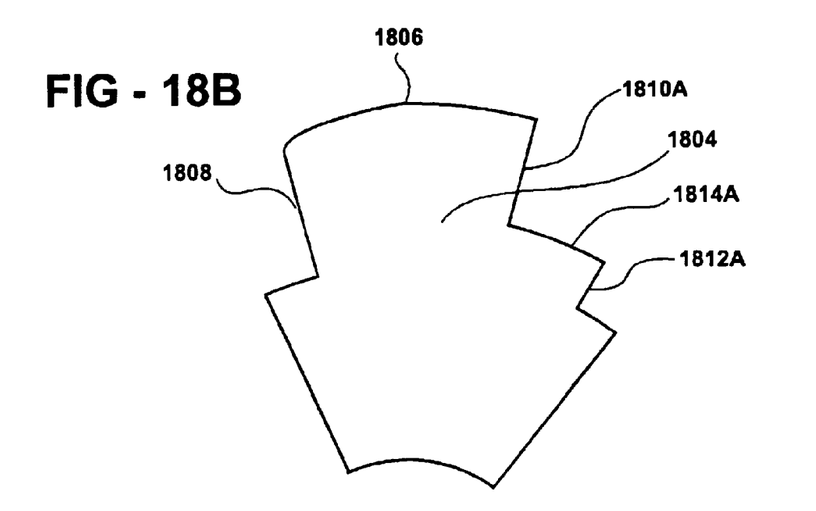
FIG. 18B is a diagrammatic illustration of a rotor armature of the rotor of FIG. 18A, according to an embodiment of the present invention.
Figure 19A:
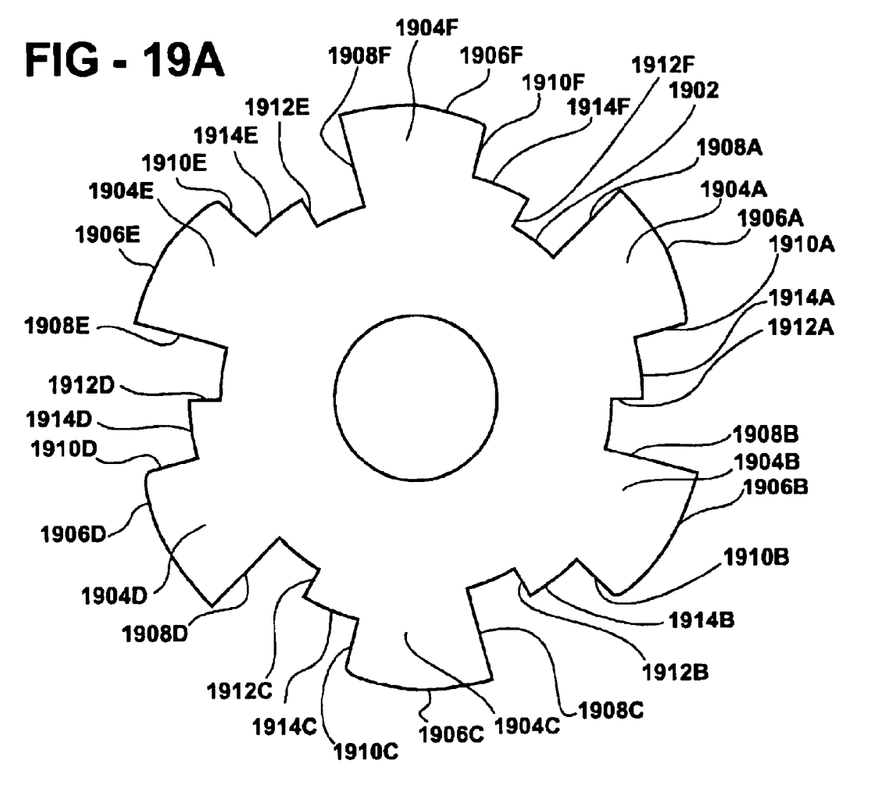
FIG. 19A is a diagrammatic illustration of a rotor having rotor armatures, according to another embodiment of the present invention.
Figure 19B:
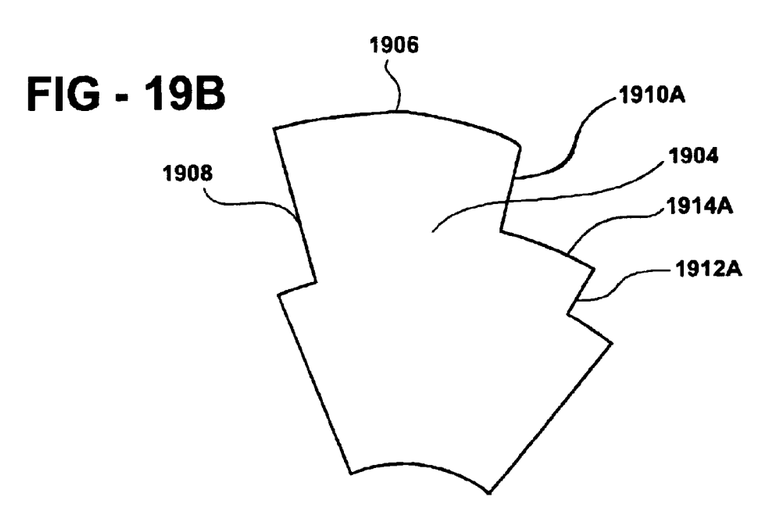
FIG. 19B is a diagrammatic illustration of a rotor armature of the rotor of FIG. 19A, according to another embodiment of the present invention.
Figure 20A:
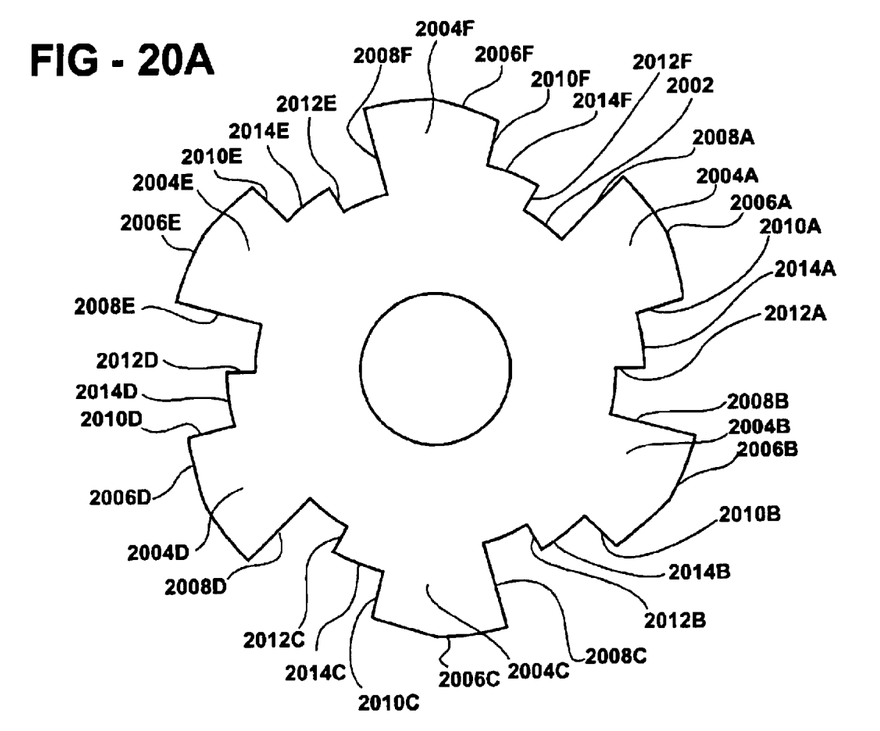
FIG. 20A is a diagrammatic illustration of a rotor, according to another embodiment of the present invention.
Figure 20B:
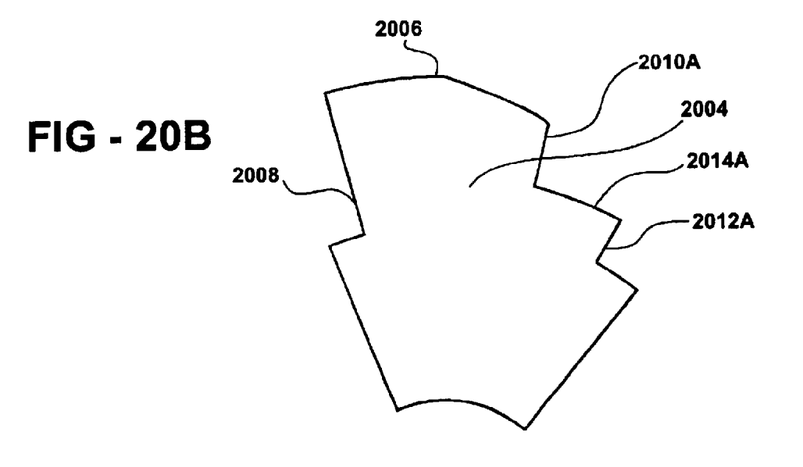
FIG. 20B is a diagrammatic illustration of a rotor, according to another embodiment of the present invention.

With reference to FIGS. 18–20, the rotor armatures may be generally cutout, straight or curved and have two asymmetrical sides. Specifically, in FIGS. 18A and 18B, a rotor 1802 includes a plurality of armatures 1804A–1804F. The armatures 1804A–1804F include an arched portion 1806A–1806F at the end of each armature 1804A–1804F. The arched portions 1806A–1806F consume approximately half the width of the armature 1804A–1804F. The width of the arched portion is exemplary only. Each armature 1804A–1804F also includes three vertical edges 1808A–1808F, 1810A–1810F and 1812A–1812F. The longest vertical edge 1808A–1808F forms one side edge of the armature 1804A–1804F. The second side edge of the armature 1804A–1804F is formed by the next shortest vertical edge 1812A–1812F. The shortest vertical edge 1810A–1810F connects the arched portion 1806A–1806F to a horizontal edge 1814A–1814F. The horizontal edge 1814A–1814F connects the shortest vertical edge 1810A–1810F to the vertical edge 1812A–1812F of the second side edge of the armature 1804A–1804F. The horizontal edge 1814A–1814F and the vertical edge 1812A–1812F of the second side of the armature 1804A–1804F form a cutout in the armature 1804A–1804F.

With particular reference to FIGS. 19A and 19B, a rotor 1902 includes a plurality of armatures 1904A–1904F. The armatures 1904A–1904F include an arched portion 1906A–1906F at the end of each armature 1904A–1904F. The arched portions 1906A–1906F consume approximately half the width of the armature 1904A–1904F. The width of the arched portion is exemplary only. Each armature 1904A–1904F also includes a first vertical edge 1908A–1908F and a second vertical edge 1910A–1910F. Preferably, the first vertical edge 1908A–1908F is longer than the second vertical edge 1910A–1910F and forms one side edge of the armature 1904A–1904F. The second side edge of the armature 1904A–1904F is formed by the second vertical edge 1910A–1910F. The arched portion 1906A–1906F and the second vertical edge 1910A–1910F are connected by a straight portion 1912A–1912F.

With particular reference to FIGS. 20A and 20B, a rotor 2002 includes a plurality of armatures 2004A–2004F. The armatures 2004A–2004F include an arched portion 2006A–2006F at the end of each armature 2004A–2004F.

The arched portions 2006A–2006F consume approximately half the width of the armature 2004A–2004F. The width of the arched portion is exemplary only. Each armature 2004A–2004F also includes a first vertical edge 2008A–2008F and a second vertical edge 2010A–2010F. The first vertical edge 2008A–2008F is preferably longer than the second vertical edge 2010A–2010F and forms one side edge of the armature 2004A–2004F. The second side edge of the armature 2004A–2004F is formed by the second vertical edge 2010A–2010F. The arched portion 2006A–2006F and the second vertical edge 2010A–2010F are connected by a curved portion 2012A–2012F.

The armature designs shown in FIGS. 18–20 are exemplary only. The armature designs may be used independently or jointly and are equally applicable to rotors having any number or armatures.

Obviously, many modifications and variations of the present invention are possible in light of the above teachings. The invention may be practiced otherwise than as specifically described within the scope of the appended claims.

What is claimed is:

1. A vacuum cleaner assembly comprising:

a housing assembly having an inlet port, an outlet port and a plurality of components;

a brushless motor having a rotor and a stator disposed in said housing assembly for providing motive power to said plurality of components;

said rotor having a plurality of rotor armatures each with a rotor tip and said stator having a plurality of stator armatures each with a stator tip, each rotor armature having first and second sides, an arched portion, and a horizontal edge, first and second vertical edges form the first and second sides of each armature, a third vertical edge connects the arched portion and the horizontal edge;

a blower assembly disposed in said housing assembly and driven by said motor for drawing air inwardly through said inlet port and exhausting air outwardly through said outlet port;

a separator disposed in said housing assembly for filtering air drawn inwardly through said inlet port before it is exhausted through said outlet port; and said rotor tips having a width different than the width of said stator tips.

2. An assembly as set forth in claim 1 with said rotor armatures being a non-constant width.

3. An assembly as set forth in claim 2 with said motor being a two-phase brushless motor wherein said stator includes an even number (N) of stator armatures and said rotor includes N+2 rotor armatures.

4. An assembly as set forth in claim 3 having four stator armatures and six rotor armatures.

5. An assembly as set forth in claim 3 with at least one of said rotor armatures having an aperture therein.

6. An assembly as set forth in claim 5 wherein each of said rotor armatures includes a plurality of layers laminated together with one of said plurality of layers having dimensions different than other of said plurality of layers.

7. An assembly as set forth in claim 1 with said rotor armatures being a constant width.

8. An assembly as set forth in claim 1 with said stator armatures being a non-constant width.

9. An assembly as set forth in claim 1 with said stator armatures being a constant width.

10. A vacuum cleaner assembly comprising:

a housing assembly having an inlet port, an outlet port and a plurality of components;

a motor disposed in said housing assembly for providing motive power to said plurality of components wherein said motor includes a rotor having a plurality of rotor armatures and a stator having a plurality of stator armatures, each rotor armature having first and second sides, an arched portion, and a horizontal edge, first and second vertical edges form the first and second sides of each armature, a third vertical edge connects the arched portion and the horizontal edge;

a blower assembly disposed in said housing assembly and driven by said motor for drawing air inwardly through said inlet port and exhausting air outwardly through said outlet port;

a separator disposed in said housing assembly for filtering air drawn inwardly through said inlet port before it is exhausted through said outlet port; and said motor being a two-phase brushless motor wherein said stator includes an even number (N) of stator armatures and said rotor includes N+2 rotor armatures with each of said rotor armatures being a non-constant width.

11. A vacuum cleaner assembly, comprising:

a housing assembly having an inlet port, an outlet port and a plurality of components;

a brushless motor having a rotor and a stator disposed in said housing assembly for providing motive power to said plurality of components;

said rotor having a plurality of rotor armatures each with a rotor tip and said stator having a plurality of stator armatures each with a stator tip, each of said rotor armatures includes a plurality of layers laminated together with one of said plurality of layers having dimensions different than other of said plurality of layers;

a blower assembly disposed in said housing assembly and driven by said motor for drawing air inwardly through said inlet port and exhausting air outwardly through said outlet port; and, a separator disposed in said housing assembly for filtering air drawn inwardly through said inlet port before it is exhausted through said outlet port.

12. An assembly as set forth in claim 11 wherein each of said rotor armatures includes a rotor tip and each of said stator armatures includes a stator tip with the width of said rotor tip being different than the width of said stator tip.

13. A vacuum cleaner assembly, comprising:

a housing assembly having an inlet port, an outlet port and a plurality of components;

a brushless motor having a rotor and a stator disposed in said housing assembly for providing motive power to said plurality of components;

said rotor having a plurality of rotor armatures each with a rotor tip and said stator having a plurality of stator armatures each with a stator tip, each rotor armature having first and second sides, an arched portion, and a horizontal edge, first and second vertical edges form the first and second sides of each armature, a third vertical edge connects the arched portion and the horizontal edge;

a blower assembly disposed in said housing assembly and driven by said motor for drawing air inwardly through said inlet port and exhausting air outwardly through said outlet port;

a separator disposed in said housing assembly for filtering air drawn inwardly through said inlet port before it is exhausted through said outlet port; and said rotor tips having a width and being as asymetric the across said width.

14. An assembly as set forth in claim 13 where each rotor is generally curved and has two asymmetrical sides.

15. A vacuum cleaner assembly, comprising:

a housing assembly having an inlet port, an outlet port and a plurality of components;

a brushless motor having a rotor and a stator disposed in said housing assembly for providing motive power to said plurality of components;

said rotor having a plurality of rotor armatures each with a rotor tip and said stator having a plurality of stator armatures each with a stator tip, each rotor armature having first and second sides, an arched portion, and a horizontal edge, first and second vertical edges form the first and second sides of each armature, a third vertical edge connects the arched portion and the horizontal edge;

a blower assembly disposed in said housing assembly and driven by said motor for drawing air inwardly through said inlet port and exhausting air outwardly through said outlet port;

a separator disposed in said housing assembly for filtering air drawn inwardly through said inlet port before it is exhausted through said outlet port; and said stator tips forming a non-uniform gap therebetween.

* * * * *